United States Patent [19]

Guerin

[11] Patent Number: 4,646,108

[45] Date of Patent: Feb. 24, 1987

[54] METHOD FOR MAGNETOGRAPHIC PRINTING, AND MAGNETOGRAPHIC PRINTING MACHINE

[75] Inventor: Christophe Guerin, Belfort, France

[73] Assignee: Cii Honeywell Bull (Societe Anonyme), Paris, France

[21] Appl. No.: 760,480

[22] Filed: Jul. 30, 1985

[30] Foreign Application Priority Data

Aug. 1, 1984 [FR] France .................................. 84 12191

[51] Int. Cl.$^4$ ............................................. G01D 15/12
[52] U.S. Cl. ...................................... 346/74.7; 346/1.1
[58] Field of Search .................. 346/74.7, 1.1; 430/39, 430/42; 358/301; 360/55

[56] References Cited

U.S. PATENT DOCUMENTS 3,965,478  2/1986  Schloemann ........................ 346/74.7

FOREIGN PATENT DOCUMENTS

0082742  6/1983  European Pat. Off. ........... 346/74.7

Primary Examiner—Arthur G. Evans
Attorney, Agent, or Firm—Kerkam, Stowell, Kondracki & Clarke

[57] ABSTRACT

The invention relates to a printing method and to a magnetic printing machine, which makes it possible to obtain images in at least two colors on a printing medium. A magnetic recording device (13) is arranged such that when it is excited by pulses it forms magnetized points on the drum (10). The points comprising elementary magnetic domains having magnetizations in different directions. The machine further includes developer applicators (40, 42), retouching devices (41, 43) and a transfer post (45), where the developers deposited onto the drum (10) are transferred onto a strip of paper (20).

22 Claims, 13 Drawing Figures

METHOD FOR MAGNETOGRAPHIC PRINTING, AND MAGNETOGRAPHIC PRINTING MACHINE

FIELD OF THE INVENTION

The present invention relates to a method for magnetographic printing which makes it possible to obtain multicolor images on a printing medium. The invention also relates to a machine for performing the method.

BACKGROUND OF THE INVENTION

Magnetographic printing machines are known which, in response to signals received from a control unit, enable the formation of images, for example images of characters, on a printing medium, generally a strip or sheet of paper. In these printing machines, which are analogous to those described and shown in the French patent application published as No. 2.305.764, corresponding to U.S. Pat. No. 3,945,343, the printing of the images is attained by first forming a latent magnetic image on the surface of a magnetic recording element, which generally takes the form of a rotating drum or an endless belt, based on received signals. This latent image comprises a group of magnetized zones of very small dimensions which are practically punctiform and are conventionally known as magnetized points. This latent image is then developed, that is, made visible, with the aid of a developer in powdered form, which comprises magnetic particles and pigments coated with a thermoplastic resin and hence is attracted only by the magnetic zones in the recording element, thereby forming an image in powder on the surface of this element. This image in powder is then transferred onto the printing medium.

For certain specific applications, it may be desirable for the image thus formed on the printing medium to appear in two different colors. In a known method, which has been described particularly in French Pat. No. 1.053.634, an image is printed in colors on the printing medium by, first, forming a latent magnetic image on the recording element, corresponding to the portions having the same color in the image that is to be printed, then developing this latent image by using a developer having this color, next transferring the image in powder that is thus obtained onto the printing medium, and finally repeating this operation as many times as there are colors in the image that is to be printed. Such a method has the disadvantage, however, that it takes a particularly long time to perform. Furthermore, despite all the care taken in lining up the different images in powder when they are transferred to the printing medium, it is practically impossible to avoid some shifting, however slight, among the various portions of the image printed in this way. This shifting disadvantageously impairs the sharpness of the image finally formed on the printing medium.

To overcome these disadvantages, a magnetographic printing method has been proposed. This method is described in U.S. Pat. No. 3,965,478, and comprises forming a plurality of magnetized zones on the surface of the recording element, which taken together constitute a latent magnetic image; each of these zones is obtained by exciting a magnetic recording head using an electric current the frequency of which is selected as a function of the color this zone is intended to provide when it is developed; the dimensions and the force of magnetic attraction of this zone are also determined by the value of the frequency used. In this method, developing the latent image formed on the recording element is attained by means of a single developer, containing particles of various colors and various sizes; the particles that are of the same size are also the same color. When the latent image is developed, the particles having a particular color (and hence a given color) are preferentially attracted by the magnetized zones having dimensions responding to a given force of attraction, such that after developing, each magnetized zone is covered by particles the color of which corresponds to the frequency that has been used to form this magnetized zone.

To perform a method of this kind, however, a developer must be used in which the particles, which are of different colors and different sizes, must be carefully calibrated. The particles of the same color must be very rigorously assured to have the same size. Furthermore, these particles must be conditioned such that they will not clump together, or else errors in color tonality will occur when the latent magnetic image is developed. Under these circumstances, it takes a particularly long time and it is particularly delicate and expensive to manufacture such a developer. On the other hand, since the magnetized zones formed on the recording element are not all the same size, depending on the color assigned to them, the images or portions of the image in which the color corresponds to large magnetized zones are poorer in definition, or fineness, than those in which the color corresponds to small magnetized zones. Finally, while the small-sized magnetized zones, when they are developed, are capable of attracting only the smallest particles in the developer, it is impossible to prevent the large-sized magnetized zones from attracting not only the large particles in the developer but also the smaller particlees, which naturally disadvantageously alters the colors.

Various magnetographic printing methods have been proposed for overcoming these problems, and reference may be made to French patent applications filed by the assignee of the present invention on Dec. 23, 1981 and published as Nos. 2.518.770, 2.518.771, 2.518.772 and 2.518.773, corresponding to U.S. Pat. Nos. 4,449,132; 4,449,130; 4,449,131; and 4,449,133, respectively. These methods enable high-quality images in color to be obtained on the printing medium within a relatively reduced length of time. In these methods, as many powdered developers are used as there are different colors in the image that is to be printed. The developers used in these methods all comprise high-retentivity particles coated with a thermoplastic resin containing a pigment, and they all have the characteristic that except for their color they have the same physical properties, and in particular the same granulometric state, the same coercive field, the same induction to saturation, the same density and the same melting point. It will be remembered that a high-retentivity material is a material which can be magnetized in a permanent manner below the Curie point, or magnetic transition temperature, while a low-retentivity material is a magnetic material which, when it is subjected to the action of an external magnetic field, retains practically no magnetization when it is withdrawn from this field.

OBJECT AND SUMMARY OF THE INVENTION

The present invention overcomes the disadvantages of the prior art and proposes a method of magnetographic printing, and a machine utilizing this method, which makes it possible to obtain bicolored images of high quality on a printing medium, in a relatively reduced length of time, while using no more than two developers, which have the same physical properties, with the exception of their color and their magnetic characteristics; that is, one of these developers includes high-retentivity particles, while the other includes low-retentivity particles.

More specifically, the invention relates to a method for magnetographic printing comprising magnetizing the surface of a magnetic recording element along a direction perpendicular to this surface, in such a manner as to form a set of separate magnetized points which constitute a latent magnetic image, said points all having the same size and each comprising the same number k, which equals at least two, of contiguous elementary magnetized domains all having the same magnetization intensity, said magnetized points belonging to either a first type in which the elementary domains all have the same magnetic polarity, or to a second type in which the magnetic polarity of the domains alternates from one of these domains to another adjacent domain; then depositing onto said surface a first developer in powder form, the color of which is that of a first of said colors, said first developer being arranged to remain applied only to the magnetized points of this surface and eliminating said first developer from said surface with the exception of the magnetized points belonging to the second type; then depositing on said surface a second powdery developer, the color of which is that of a second of said colors, said second developer being adapted to remain applied only to the magnetized points of said surface, said first and second powdery developers including magnetic particles and having practically the same physical properties with the exception of their color and their magnetic characteristics; eliminating said second developer from said surface with the exception of the developer applied at magnetized points belonging to the first type, each of said latter points of the first type thus being covered with a single layer of said second developer, while each of the magnetized points of the second type is covered by a single layer of said first developer; and finally effecting a transfer of all the layers of developers onto the printing medium.

The invention also relates to a magnetographic printing machine for performing the method described above, this machine including a recording element provided with a magnetic recording surface, a magnetic recording device comprising a plurality of recording heads controlled by electric pulses adapted to magnetize the recording heads in response to these pulses in a direction perpendicular to the recording surface so as to form on this surface a set of magnetized points which define a latent magnetic image, said points all having the same size and each comprising a number k, which equals at least two, of contiguous elementary magnetic domains, said domains all having the same intensity of magnetization, drive means for effecting a relative displacement between the recording element and the recording device, a source of pulses arranged for selectively sending electric pulses to said recording heads, current controlling and inverting means disposed between the recording heads and the source of pulses for selectively reversing the direction of current of the pulses transmitted in order to form on the recording surface magnetized points belonging to either a first type in which the elementary domains all have the same magnetic polarity, or a second type in which the magnetic polarity alternates from one domain to an adjacent domain, a first applicator device enabling the deposition on this recording surface of a first developer in powder form having the color of one of two previously selected colors, a second applicator device placed downstream, with respect to the direction of displacement of this surface, of the first applicator device and arranged to deposit on this surface a second developer in powder form having the color of another of said selected colors, these developers remaining applied only to the magnetized points of this surface in order to form an image in powder, said first and second developers including magnetic particles having practically the same physical properties with the exception of their color and their magnetic characteristics, a first retouching device disposed between said first and second applicator devices and arranged to withdraw said first developer from the recording surface, with the exception of the magnetized points belonging to the second type, a second retouching device disposed downstream of said second applicator device and arranged to withdraw said second developer from said surface, with the exception of the magnetized points belonging to the first type such that each of these points is covered with a single layer of said second developer, while each of the points of the second type is covered with a single layer of said first developer, said two developers thus forming an image in powder in two colors on the recording surface, and a transfer post for transferring this image in powder onto a printing medium.

The invention will be better understood and further objects, details and advantages thereof will become more apparent from the ensuing description, given by way of non-limiting exaxple and taken in conjunction with the drawings.

BRIEF DESCRIPTION OF THE DRAWINGS

FIG. 1, comprising sectional views labelled

DESCRIPTION OF THE PREFERRED EMBODIMENTS

FIG. 1, on an enlarged scale, shows a section through a magnetic recording element 10, of a known type, which can be used for performing the method according to the invention. It will be assumed for the purposes of the example described that this magnetic recording elmeent is a type analogous to the one described in French Pat. No. 2.402.921, which corresponds to U.S. Pat. No. 4,205,120, and that it includes a medium 11 made of a material having a high magnetic permeability, such as iron or low-carbon steel, this medium being coated with a layer 12 of a magnetic material of high coercivity, such as the magnetic alloy nickel-cobalt. In the exemplary embodiment of the printing method according to the invention, this recording element 10 is magnetized transversally by means of one or more recording heads of a known type. It will be assumed in the example described that these recording heads which have been used to effect this magnetization are those shown in FIGS. 3 and 4 and identified there by reference symbols such as T11, T12, T13, T21, etc.

Figure 4:
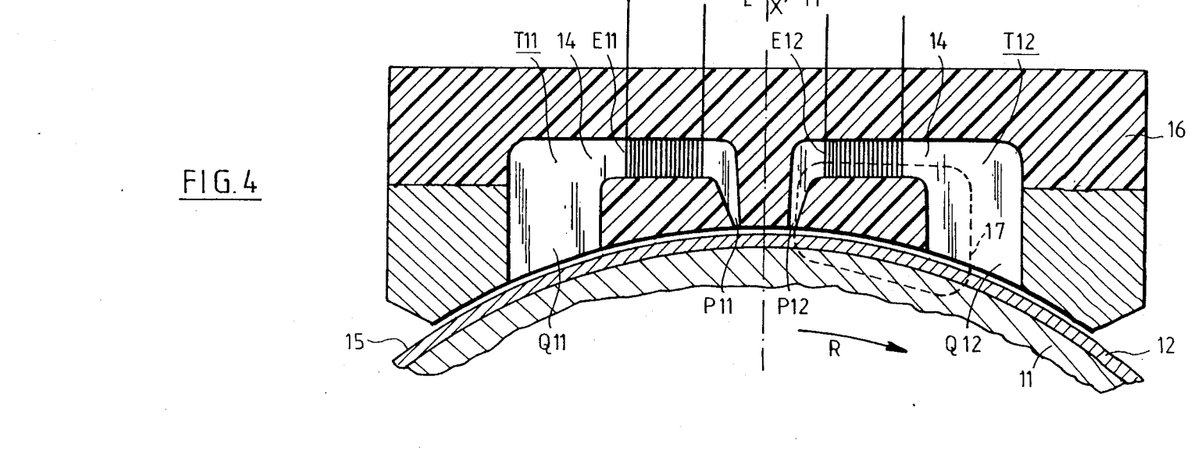
FIG. 4 is a sectional view taken along a line indicated by dot-dash lines and in the direction of the arrows 4—4 of the recording device shown in FIG. 3.

As shown in FIG. 4, each of these heads includes a thin metal core 14, of strong magnetic permeability, on which a winding is wound, such as the winding E11, connected to an electric exciting circuit which will be described below. This core 14 is substantially in the shape of an inverted U and at its ends it has a recordng pole, such as P11, and a pole for closing the flux, such as Q11. These two poles are disposed near the surface 15 of the magnetic layer 12, as shown in FIG. 4, such that the core 14, the medium 11 and the two regions which are included between this core and this support and are located vertically to the recording pole and the flux closing pole, forming a closed magnetic circuit. It must be noted that although in the case shown in FIG. 4 the recording pole and the flux closing pole are located near the surface 15 of the magnetic layer 12, a different arrangement, in which these two poles are placed in contact with this surface, may also be used.

If an electric pulse having a suitable intensity is supplied to the winding of of the recording heads, for example the recording head T12, then this pulse creates a magnetic flux in the interior of the core of this head; the line of mean force of this flux is indicated by the broken lines 17.

Figure 5:
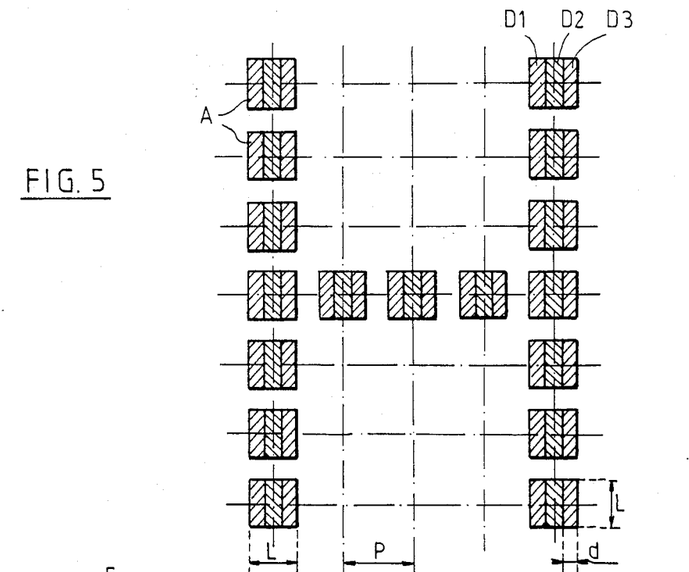
FIG. 5 is a diagrammatic representation of an arrangement of magnetized points which has been formed on the recording element in order to comprise the magnetic latent image of one character.

In the portion of the magnetic layer 12 located vertically with respect to the recording pole of this head, the magnetic field is perpendicular to the surface 15 of this layer, so that in this portion, the magnetization of the magnetic layer 12 is effected quite perpendicularly to this surface. In this portion, the magnetic field created by this head causes a magnetized zone of very small dimensions to appear, which will hereinafter be called the elementary magnetic domain; this magnetized zone persists even when the winding later ceases to have a current passing through it. Contrarily, given that the dimensions of the recording pole of each head are much smaller than those of the flux closing pole of this head, as may be seen in FIGS. 3 and 4, the density of the magnetic flux under the flux closing pole is much less than that of the magnetic flux under the recording pole. Because of this fact, the magnetic flux under the flux closing pole is capable neither of forming elementary magnetized domains in the magnetic layer 12 nor of modifying the elementary magnetized domains already formed in this layer. Thus, as indicated above, the elementary magnetized domains which are thus formed in the magnetic layer 12 are of very small dimensions. Accordingly, in the example described, each of these domains appears on the surface 15 of the magnetic layer 12 in the form of a very small rectangle, the length of which is in the vicinity of 200 microns, and the width of which is practically equal to 70 microns. Meanwhile, the recording heads and the electrical control circuits for these heads are arranged in a manner to be described below, such that these elementary magnetized domains are not separated from one another on the surface 15, but on the contrary are contiguous with one another so as to form distinct groups of elementary magnetized domains, each of these groups including the same number k of juxtaposed elementary magnetized domains. Nevertheless, the arrangement and the number k of the elementary magnetized domains which constitute each of the groups is arranged such that each group retains sufficiently small dimensions that it is capable of being assimilated on a practically punctiform magnetized zone, the dimensions of each zone remaining in fact less than 500 microns. For this reason, each group will hereinafter be designated as a magnetized point. However, it must be noted that the magnetized points which are thus formed on the magnetic layer 12 all have the same configuration and the same dimensions. This is why, in the exemplary embodiment shown in FIG. 5, each magnetized point, labelled A in this figure, comprises three elementary magnetized domains D1, D2 and D3, which are contiguous with one another, the domain D2 here being flanked by the domains D1 and D3. Each of these domains has the shape of a small rectangle, the length L of which is substantially equal to three times the width d. Thus, in the case where this width is practically equal to 70 microns, the length L of each domain is substantially equal to 210 microns. In the example shown in FIG. 5, the three magnetized domains D1, D2 and D3 which form the same magnetized point A are coupled together on their long side, such that each magnetized point A has substantially the shape of a square, the length L of each side of which is substantially equal to 210 microns. It should be noted that the constitution of the magnetized points A as shown in FIG. 5 is not exclusive in the invention. In another embodiment, each magnetized point could quite well comprise four elementary magnetized domains, for instance, each having the form of a square 100 microns on a side, and these four domains being coupled together so as to form a magnetized point having the form of a square that is 200 microns on each side.

The magnetized points which are thus formed on the magnetic layer 12 are distributed in such a manner that they comprise a latent magnetic image on the surface 15 of this layer, the image having a predetermined configuration, for instance that of one character. By way of illustration, a set of magnetized points A has been shown in FIG. 5 arranged in a rectangular matrix including seven lines and five columns and distributed on the interior of this matrix such as to comprise the image of the letter "H". Thus, as indicated above, each of these magnetized points here takes the form of a square, the length L of each side of which is substantially equal to 210 microns, this square being formed by the juxtaposition of three elementary magnetized domains D1, D2 and D3 each having the form of a rectangle the length L of which is subtantially equal to 210 microns. It should also be noted that the center-to-center spacing P between the lines and the columns of the matrix, along which the magnetized points are placed, is at least equal to the sum of L+d, that is, 280 microns in the present example. Under these conditions, the magnetizations provided by two adjacent magnetized points have no effect of any kind on each other.

Referring now to FIGS. 1A–1F, the method which makes it possible to obtain an image in two colors on a recording medium by magnetographic means will now be described. In this case, the recording medium comprises a strip of paper.

Figure 1A:
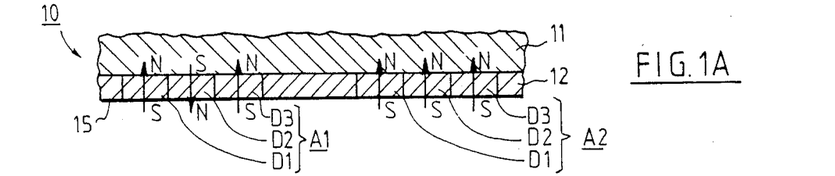
FIGS. 1A–1F, illustrates the various phases in the method for magnetographic printing according to the invention.

In the phase illustrated by FIG. 1A, the recording element 10 is magnetized such as to form magnetized points on its surface, all of which, being of the type described above, include the same number k of elementary magnetized domains. In the case shown in FIG. 1A, each magnetized point includes three elementary magnetized domains disposed in an analogous manner to that shown in FIG. 5. In FIG. 1A, only two of these magnetized points, A1 and A2, have been shown, for the sake of simplification; however, it should be noted that there can be absolutely any arbitrary number of these magnetized points. In FIG. 1A, the north (N) and south (S) magnetic poles, as well as the respective magnetizations, of the elementary magnetized zones D1, D2 and D3 forming the magnetized points A1 and A2 have also been shown. Each of these magnetizations is represented by an arrow, the length of which is proportional to the value of magnetization. Thus it is apparent from FIG. 1A that the magnetizations of the different elementary magnetized domains all have the same value, but certain ones are oriented in the opposite direction from the others, such that the magnetized points formed on the magnetic layer 12 can be classified into two different types. More specifically, the magnetized points, such as A2, which belong to the first type are characterized by the fact that the magnetized domains D1, D2 and D3 forming them all have magnetizations oriented in the same direction. Contrarily, the magnetized points, such as A1, which belong to the second type are characterized by the fact that the magnetized domains D1, D2 and D3 forming them have magnetizations the direction of which reverses when one passes from one of these magnetized domains to another domain contiguous with it.

In the exemplary embodiment shown in FIG. 1A, the direction of magnetizations is selected such that the magnetized domains which form the magnetized points belonging to the first type, having a south magnetic polarity (S) on the surface 15 of the recording element 10, while the magnetized domains D1, D2 and D3 forming each of the magnetized points belonging to the second type have, respectively, south (S), north (N) and south (S) magnetic polarities on this surface 15. Generally, the magnetized points such as A2 which belong to the first type are intended to permit the formation of images or portions of images on the printing medium which necessarily appear in one of at least two selected colors, while the magnetized points such as A1 belonging to the second type are intended to permit the formation of images or portions of images on the printing medium which necessarily appear in another of a selected color.

The apparatus which is used to form magnetized points belonging to one or the other of the two types of points described above on the magnetic layer 12 will be described below. This is why it there will be no further discussion as to how these magnetized points are obtained. It will simply be noted that when the magnetization of the magnetic layer 12 is completed, a first developer in powder form is deposited on the surface 15 of this layer, this first developer comprising low-retentivity particles coated with a thermoplastic resin containing a pigment, the color of which is one of the colors selected. In the example described, it will be assumed that this pigment is red in color. In the example described, the low-retentivity particles which become part of the composition of this first developer are iron particles; however, they may be made of any other highly permeable, low-remanence magnetic material, such as a permalloy or a soft ferrite described by the formula MO, $Fe_2O_3$, in which M is a metal selected from the group of metals including manganese, zinc or nickel.

Figure 1B:
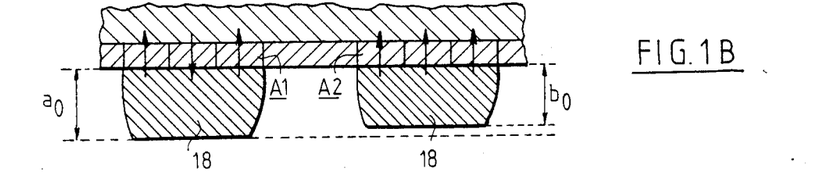

This first developer, which is deposited on the entire surface 15, is not attracted, however, except by the magnetized points on the surface, such that if it is intended to remove this developer from this surface with the exception of the magnetized points, for instance by turning the recording element 10 over such that the developer particles not subjected to the magnetic attaction exerted by the magnetized points fall by their own weight, then the result is deposits of developer solely on the magnetized points. Under these conditions, as shown in FIG. 1B, each magnetized point is covered by a layer 18 of the first developer, the thickness of this layer being increasingly great as the force of magnetic attraction exerted by the magnetized point on which this layer is deposited becomes greater. It must be noted that in fact the force with which each of the particles of the developer which have been deposited on the same magnetized point is attracted depends not only on the type to which this point belongs, that is, on the direction along which the magnetizations of the elementary magnetized domains comprising this point are oriented with respect to one another, but also on the distance h which separates each particle of this point, as well as on the physical characteristics of this developer, such as the granulometric state and the percentage of magnetic particles in this developer.

Figure 7:
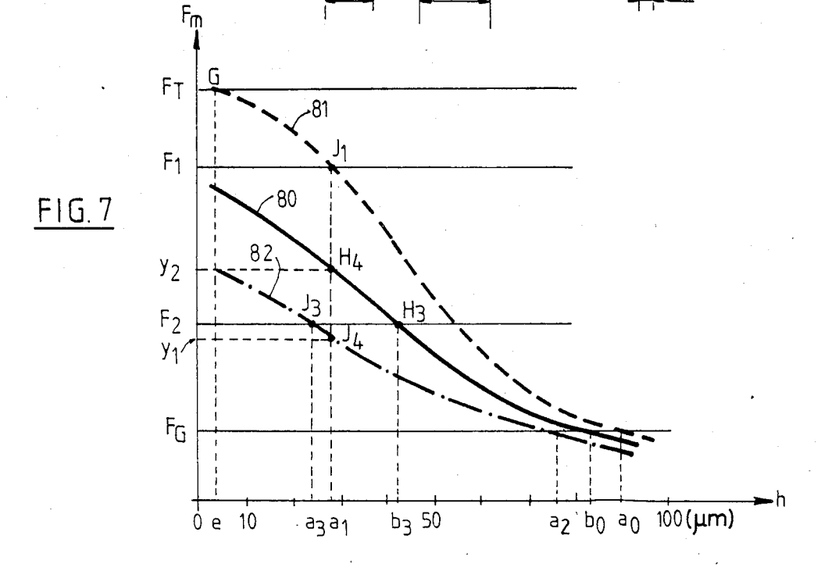
FIG. 7 shows a graph illustrating the manner in which the force of magnetic attraction exerted on each magnetized point formed on the recording element belonging to the machine shown in FIG. 2 varies.

For a given developer, the magnetic force of attraction exerted upon a particle of developer deposited on a magnetized point of the second type, such as A1, is more elevated than that exerted on this particle when the particle is deposited on a magnetized point of the first type, such as A2. Moreover, the value $F_m$ of this magnetic force is all the less, the greater the distance h which separates this particle from this point. The variations in this distance h are illustrated by the curves in FIG. 7. In FIG. 7, the curve 81 shown in broken lines illustrates the variations, as a function of h, in the force of magnetic attractions exerted by the magnetized point of the second type, A1. In like manner, the curve 80 shown in solid lines represents the variations, as a function of h, in the force of magnetic attraction exerted by the magnetized point of the first type, A2. FIG. 7 also shows the value $F_G$ of the force of gravity to which each particle in the developer is subjected when this particle is deposited on the recording element 10. This force of gravity is exerted contrary to the force of magnetic attraction. It will be appreciated that under these conditions, for each of the magnetized points A1 and A2, there is a value of the distance h for which this force of gravity $F_G$ is balanced by the force of magnetic attraction exerted by each of these points. This particular value determines the thickness of the layer of developer remaining on this magnetized point. Given that the magnetic force exerted by the magnetized point A1 on a particle located at a given distance from this point A1 is greater than that exerted by the magnetized point A2 on a particle located at the same distance from this point A2, the particular value $a_0$ for which the magnetic force exerted by A1 is balanced by the force $F_G$ is greater than the value $b_0$ for which the magnetic force exerted by A2 is balanced by $F_G$. FIG. 7 shows that in the example described, $a_0$ is substantially equal to 90 microns, while $b_0$ is substantially equal to 83 microns. These values determine the respective thicknesses of the layers 18 of the first developer which are deposited on the magnetized points A1 and A2.

Figure 1C:
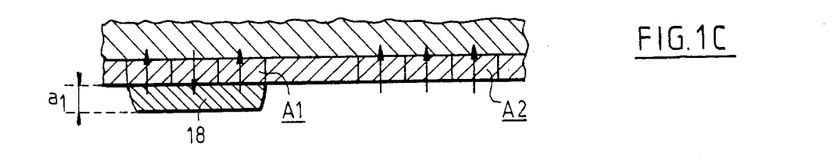

The magnetized points of the recording element 10 having thus been coated by a layer 18 of the first developer. This recording element is now subjected to a retouching operation, intended not only to eliminate the residual particles of first developer that remain outside the magnetized points of this element, but also to withdraw all the particles of developer which are located on the magnetized points of the first type, such as A2. During this retouching operation, which is preferably realized by pneumatic means (suction or blowing of air), each of the developer particles located on the surface 15 of the magnetic layer 12 is subjected to a constant force having a value $F_1$, which is exerted counter to the magnetic force $F_m$. In the diagram of FIG. 7, the value $F_1$ of this retouching force has been shown. This value $F_1$ is selected such that the ordinate line for $F_1$ intersects only the curve 81. In FIG. 7, the abscissa of the point of intersection $J_1$ of the curve 81 and the ordinate line $F_1$ is also indicated, as $a_1$. Thus it is apparent that for the particles of developer which have been deposited on each of the magnetized points of the second type (such as A1) and which are located at a distance less than $a_1$, the magnetic force exerted by this magnetized point is greater than the retouching force $F_1$, such that these particles will remain on this magnetized point. Contrarily, for the developer particles which, for each of the magnetized points of the second type, are located at a distance greater than $a_1$, the magnetic force exerted by this magnetized point is less than the retouching force $F_1$, such that these particles will be eliminated from this point. As a consequence, on each of the magnetized points of the second type (such as A1), a layer of first developer having a thickness practically equal to $a_1$ will remain. As for the particles of the first developer which are deposited on each of the magnetized points of the second type (such as A2), given that the magnetic force exerted by each of these points is always less than the retouching force $F_1$, these particles cannot remain on these points, and are thus eliminated completely. Finally, at the end of the retouching operation, as shown in FIG. 1C, only the magnetized points of the second type (such as A1) appear covered by a layer of the first developer, having the thickness $a_1$.

Figure 1D:
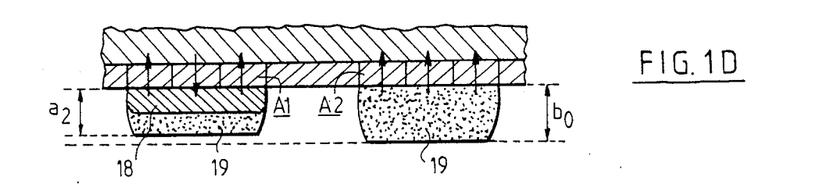

When the retouching operation that has just been described is completed, a second developer in powder form is then deposited on the surface 15 of the recording element 10, comprising high-retentivity particles coated with a thermoplastic resin containing a pigment the color of which is the other of the two selected colors referred to above. In the example described, it will be assumed that this pigment is black in color. In the example described, the high-retentivity particles which become part of the composition of the second developer are particles of magnetic iron oxide $Fe_3O_4$, but they may be made of any other magnetic material having high coercivity and high remanence, for example an alloy of iron and nickel containing about 78% nickel, iron carbide, or a hard ferrite having the general formula $MFeO_3$, in which M is a metal selected from the group of metals including barium, strontium, cobalt and the rare earths. The depositing of this second developer is effected under the same conditions as those described for depositing the first developer, but with the difference that since the magnetized points of the second type are now coated with a layer of the first developer, the lines of magnetic force that are produced by the elementary magnetized domain D2 of each of these points are captured for the most part by the particles of the first developer, so as to loop back across the elementary magnetized domains D1 and D3 contiguous with this domain D2. The result is accordingly an attenuation of the magnetic force exerted by the magnetized points of the second type; the variations in this magnetic force, as a function of the above-mentioned distance h, are represented in FIG. 7 by the dot-dash curve 82. It should be noted that as shown in FIG. 7, this curve 82 is located below the curve 80. Under these conditions, the abscissa $a_2$ of the point of intersection with the ordinate line $F_G$ is less than the abscissa $b_0$ of the point of intersection of this curve 80 with this same line $F_G$. FIG. 7 shows that in the example described, $a_2$ is substantially equal to 75 microns. Finally, as shown in FIG. 1D, when the deposition of the second developer on the surface 15 has been completed, each magnetized point of the first type (such as A2) is covered with a layer 19 of second developer, having a thickness $b_0$, while each magnetized point of the second type (such as A1) is covered with a layer 18 of first developer which in turn is covered with a layer 19 of the second developer; the thickness of these two layers 18 and 19, taken together, is equal to $a_2$.

Figure 1E:
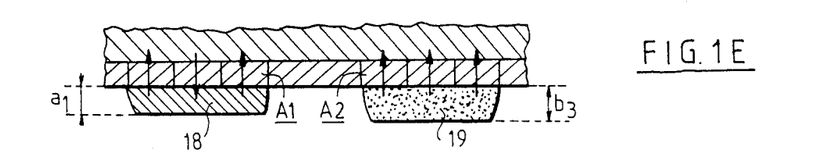

When the deposition of the second developer onto the recording element 10 has been completed, this recording element is subjected to a second retouching operation, analogous to the one described above. In the course of this retouching operation, which is preferably realized pneumatically, each of the particles of the two developers located on the surface 15 of this element is subjected to a constant force, having a value $F_2$, which is exerted counter to the magnetic force $F_m$. The value $F_2$ of this retouching force has been shown in the diagram of FIG. 7, this value preferably being selected such as to remain practically included between the values $y_1$ and $y_2$ of the respective ordinates of the points $J_4$ and $H_4$ where the abscissa line $a_1$ intersects the curves 80 and 82. This choice is made in accordance with the following considerations. In fact, if $J_3$ designates the point of intersection of the ordinate line $F_2$ with the curve 82, and if it is assumed that solely the layers 19 of second developer are superimposed on the layers 18 of first developer, the particles of the second developer, which in each of the layers 19 are located at a distance from the surface 15 which is greater than the value $a_3$ for the abscissa of this point $J_3$, are subjected to a magnetic force $F_m$ the intensity of which is less than that of the retouching force $F_2$. As a consequence, these particles will be eliminated from the areas where they are located. Contrarily, the particles of the second developer, which in each of these layers 19 are located at a distance from the surface 15 which is less than this value $a_3$, are subjected to a magnetic force the value of which is greater than that of the force $F_2$, such that these particles are not eliminated by this retouching force. It will thus be appreciated that on the layers 18 of first developer, nothing remains except the particles of second developer which are located at a distance from the surface 15 that is at least equal to $a_3$. As a consequence, if this value $a_3$ is selected such that it virtually never exceeds the value $a_1$, which represents the thickness of each of the layers of the first developer, then the result obtained is a virtually total elimination of the particles of the second developer on each of the layers 18. Hence, in the example illustrated by the diagram in FIG. 7, the value of the retouching force is such that the abscissa $a_3$ of the point $J_2$ is less than this value $a_1$. In this case, the layers 19 of the second developer which are superimposed on the layers 18 of the first developer are eliminated completely, as shown in FIG. 1E. In this case, however, because the intensity of the retouching force $F_2$ is less than that of the retouching force $F_1$, none of the particles of the first developer which are still located on the magnetized points of the second type (such as A1) are eliminated by the retouching force $F_2$, so that after this second retouching operation, each magnetized point of the second type remains covered by a layer 18 of first developer, having a thickness $a_1$.

Returning to FIG. 7 once again, it will be noted that the ordinate line $F_2$ intersects the curve 80 at a point $H_3$ of which the abscissa is $b_3$. As already mentioned, this curve 80 represents the variations, as a function of h, of the magnetic force exerted by each magnetized point of the first type. For the above-mentioned reasons, it will be understood that the retouching force $F_2$ also has the effect of decreasing the thickness of the layer 19 of the second developer located on each of the magnetized points of the first type (such as A2) to the value $b_3$. This, finally, is illustrated in FIG. 1E, where the magnetized point of the first type, A2, is covered by a layer 19, having a thickness $b_3$, of second developer, and where the magnetized point of the second type, A1, is covered by a layer 18, having a thickness $a_1$, of the first developer. It should also be noted that except for their color and their magnetic properties, these two developers have practically the same physical properties, in particular the same granulometric state, the same density and the same melting point. If it is provided that the retouching force $F_2$ has a value such that the ordinate line $F_2$ passes substantially through the point of intersection $H_4$ of the curve 80 with the abscissa line $a_1$, a layer 19 of second developer will also be obtained on the magnetized point of the first type A2, with the thickness $b_3$ of this layer 19 being practically equal to the thickness $a_1$ of the layer 18 of first developer covering the magnetized point of the second type A1.

Finally, with a retouching force the vaue $F_2$ of which remains included between the above-mentioned values $y_1$ and $y_2$, the layers of second developer which were superimposed on the layers of first developer will have been completely eliminated, while the layers of second developer covering the magnetized points of the first type are reduced to a thickness $b_3$ at least equal to the thickness $a_1$ of the layers of first developer covering the magnetized points of the second type.

This second retouching operation can also be performed using a retouching force the value $F_2$ of which is included between $y_2$ and $F_1$, but in that case the result obtained, on each magnetized point of the first type, is a layer of second developer the thickness $b_3$ of which is less than $a_1$, and the thickness of this layer decreases further, the nearer the value $F_2$ of the retouching force approaches to the value $F_1$.

Figure 1F:
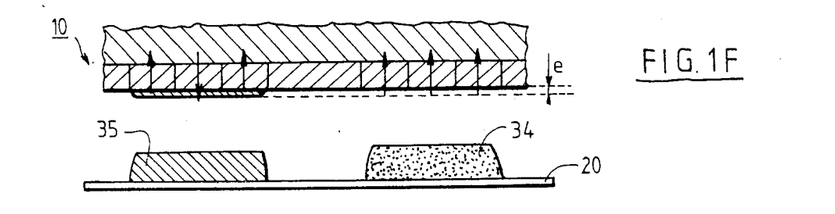

When the second retouching operation that has just been described is completed, a strip of paper 20 that is to be printed is placed either near or in contact with the recording element 10, as shown in FIG. 1F, and the layers of developers which are located on the magnetized points of this element are accordingly transferred onto this strip of paper. This transfer operation can also be effected in a known manner, either by pressing the strip of paper 20 onto the recording element 10 or by using magnetic or electrostatic means. In any event it is assumed that whatever means is used to effect this operation, the transfer force used during this operation retains a constant value $F_T$. The value $F_T$ of this force has been shown in FIG. 7. It should be noted here that this value $F_T$ is selected in such a manner that all, or virtually all, of the particles located on the element 10 can be transferred onto the strip of paper 20. Naturally a transfer force can be used, the value $F_t$ of which is such that the ordinate line $F_T$ is located above the curve 81 and does not intersect this curve. Under these conditions, all the developer particles are transferred onto the strip of paper 20. However, the value $F_T$ of the transfer force can also be selected such that the ordinate line $F_T$ intersects the curve 81 at a point G, the abscissa e of which is near zero, for example being equal to 3 microns. In this case, nearly all the particles of first developer located on the magnetized points of the second type are transferred onto the strip of paper 20, while the particles of the second developer which are located on the magnetized points of the first type are transferred totally onto this strip of paper. In this case, consequently, when the transfer operation has been completed, a film of first developer will remain on each of the magnetized points of the second type on the recording element 10, and the thickness of this film will be virtually negligible. Finally, each layer 19 which prior to the transfer covered each magnetized point of the first type will now, when it is transferred completely onto the strip of paper 20, form a small pile 34 which is made up solely of the particles of the second developer. In like fashion, each layer 18 which, prior to the transfer, covered each magnetized point of the second type now, when it is transferred completely, or virtually completely, onto the strip of paper 20, forms a small pile 35, which is made up solely of the particles of the first developer.

The layers of developer which have thus been transferred onto the strip of paper 20 then undergo a fixation operation intended to affix these layers finally to the paper. This operation is performed at a temperature that enables the two developers comprising these layers to enter at least the viscous state. However, in a preferred embodiment for performing the method, this temperature is selected such that the two developers are caused to melt, yet such that there is no danger that the paper will burn or blacken. Under these conditions, after this fixation operation, each of the piles 34 forms a punctiform spot on the paper, this spot being the color of the second developer, i.e., black in the present example, while each of the piles 35 forms a punctiform spot on the paper which has the color of the first developer, i.e. red in the present example.

Figure 2:
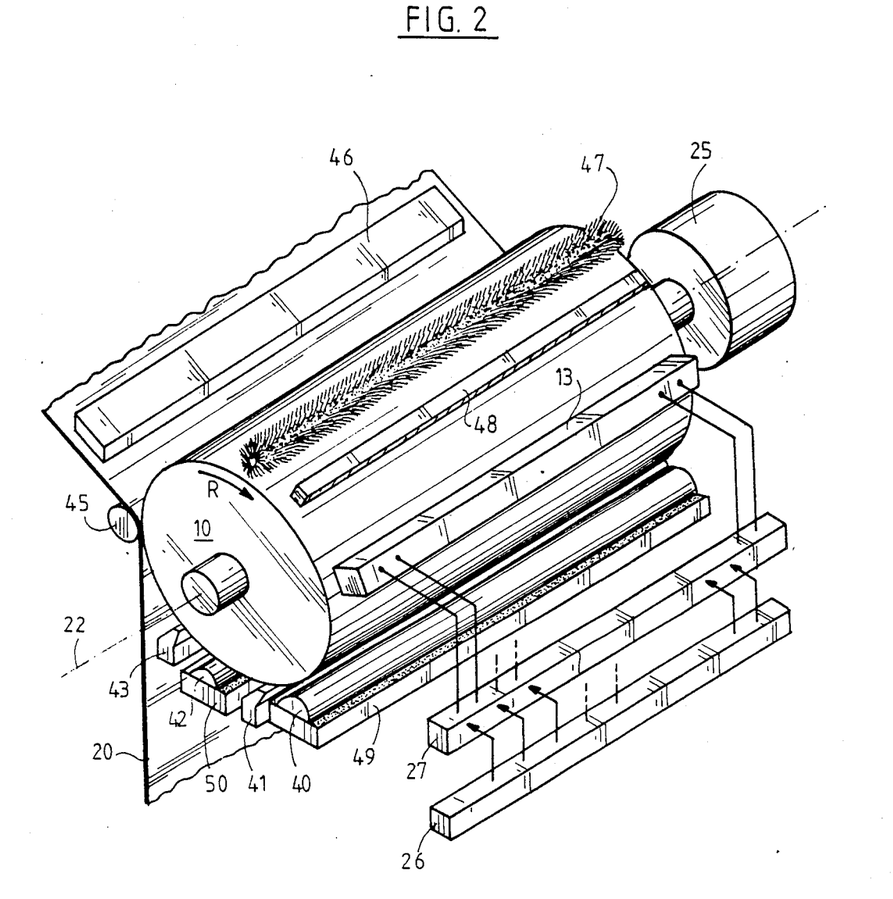
FIG. 2 shows an exemplary embodiment of a printing machine which performs the printing method according to the invention.

In FIG. 2, a magnetographic printing machine has been shown with which printing in two colors by the printing method that has just been described can be performed. The machine shown in this figure includes a magnetic recording element in the form of a magnetic drum 10 analogous to the one described and shown in the above-mentioned French Pat. No. 2.402.921, which corresponds to U.S. Pat. No. 4,205,120. This drum is made to rotate in the direction indicated by the arrow R by an electric motor 25. The magnetization of the magnetic layer of this drum is assured by a magnetic recording device 13, the structure of which has been shown in detail in FIGS. 3 and 4. Referring now to these figures, the recording device 13 is seen to include a plurality of magnetic recording heads T11, T12, T13, T21, ..., Tn1, Tn2, Tn3, shown molded on the interior of a casting 16 comprising a nonmagnetic material, such as a thermosettable resin, for example. These heads, which are identical, are also separated from one another by a portion of this casting; this assures a rigidly defined disposition of these heads with respect to one another.

It should now be noted that in the general case where each magnetized point includes k elementary magnetized domains contiguous with one another, the magnetic heads of the recording device in a particularly advantageous embodiment of the invention are arranged such as to comprise groups of magnetic heads, each group including k heads. Thus, in the example described, where each magnetized point includes three juxtaposed elementary magnetized domains which are aligned along a direction parallel to the generatrixes of the drum, the heads of the recording device 13 are arranged so as to comprise groups of heads each including three heads. Thus the three heads T11, T12 and T13 form a first group of heads, which hereinafter will be called the group G1. In like manner, the three heads T21, T22 and T23 form a second group of heads, hereinafter identified as the group G2, and so forth. It will be appreciated that under these conditions, when the k heads of the same group are excited, in a manner to be described below, these k heads form the k elementary magnetized domains which constitute the same magnetized point, on the magnetic layer 12.

Thus when they are excited, in a manner to be explained below, the three heads T11, T12 and T13 comprising the group G1, for example, cause the formation on the magnetic layer 12 of three elementary magnetized domains D1, D2 and D3 which are part of the same magnetized point. In like manner, the three heads T21, T22, T23 comprising the group G2 serve to form the three elementary magnetized domains of a second magnetized point, and so forth. Given that in the example described, these three elementary magnetized domains are aligned along a direction parallel to the generatrixes of the drum 10, the three heads used to form these three domains can be disposed in such a manner that their respective recording poles are themselves aligned along a direction parallel to these generatrixes. However, in order to avoid the undesirable effects resulting from magnetic couplings, the three heads of each group are disposed not side by side, but rather as shown in FIG. 3, that is, on both sides of a plane XX' which passes through the axis of rotation 22 of the drum.

Figure 3:
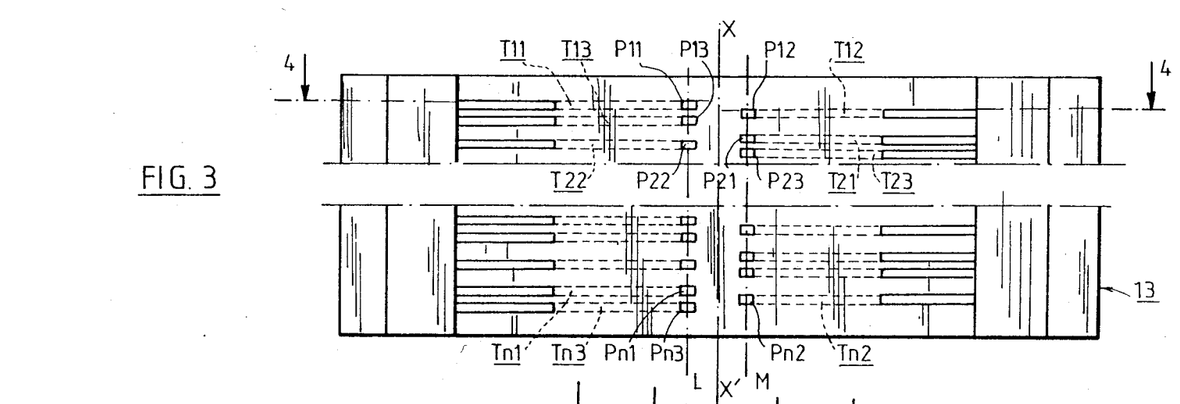
FIG. 3 is a view from beneath the magnetic recording device with which the machine shown in FIG. 2 is equipped, this view showing the relative disposition of the recording heads belonging to this device.

As shown in FIG. 3, the heads T11 and T13 of the group G1 are located on the left of this plane XX', while the head T12 of this group is placed on the right of the plane XX'. Thus, in the example shown in FIG. 3, it is apparent that the heads which are located on the left of the plane XX' are the heads T11, T13, T22, T31, T33, ..., Tn1 and Tn3, these heads being parallel to one another and disposed such that their respective recording poles P11, P13, P22, P31, P33, ..., Pn1 and Pn3 are aligned along a straight line L parallel to the generatrixes of the drum 10. In like manner, the heads which, in this example, are located on the right of the plane XX' are the heads T12, T21, T23, T32, ..., Tn2, these heads being parallel to one another and disposed such that their respective recording poles P12, P21, P23, P32, ..., Pn2 are aligned along a straight line M parallel to the generatrixes of the drum 10. Furthermore, in each group of three heads serving to form the same magnetized point, the two flanking heads, such as T11 and T13, are spaced apart from one another by a distance equal to the thickness d of each head, while the third head, such as T12, is disposed vertically with respect to the interval by which these flanking heads are spaced apart. It will be understood that under these conditions, if the heads T11 and T13, for example, are excited simultaneously by means of a pulse of electric current, two elementary magnetized domains D1 and D3 will form on the surface 15 of the magnetic layer 12, each of these domains having a width substantially equal to d and being spaced apart from one another by a distance virtually equal to d. If the linear speed of displacement of this magnetic layer is designated as V and the spacing between the above-mentioned two straight lines L and M is designated as H, then the time T it takes for these two domains to move from their initial position under the poles P11 and P13 to a position located vertically with respect to the pole P12 will be equal to H/V. The result is that if the head T12 is excited at the end of the time T, counting from the instant when the heads T11 and T12 are excited, then a third elementary magnetic domain D2 will form in the interval separating the two domains D1 and D3 that were already formed; all of these three domains now constitute a magnetized point.

It should again be noted that these magnetic heads of the recording device are distributed among two different categories of heads. The heads, such as T11, T13, T21, T23, ..., Tn1, Tn3, which are intended for forming elementary magnetized domains such as D1 and D3 all having the same magnetic polarity (in this case, south) on the surface 15 of the magnetic layer 12 belong to the second category. Contrarily, the heads, such as T12, T22, ..., Tn2, are intended to form the elementary magnetized domains such as D2, having either a south magnetic polarity or a north magnetic polarity, according to which the magnetized points belonging to these domains are of either the first or the second type, belong to the first category. Thus there are p heads of the first category and (k−p) heads of the second category among k magnetic heads of the same group, p being an integer which is equal to (k)/2, in the case where k is even, and is equal to (k−1)/2, in the case where k is odd. Thus, in the example described, where k equals 3, there is a single head of the first category and two heads of the second category in each group of heads.

Figure 6A:
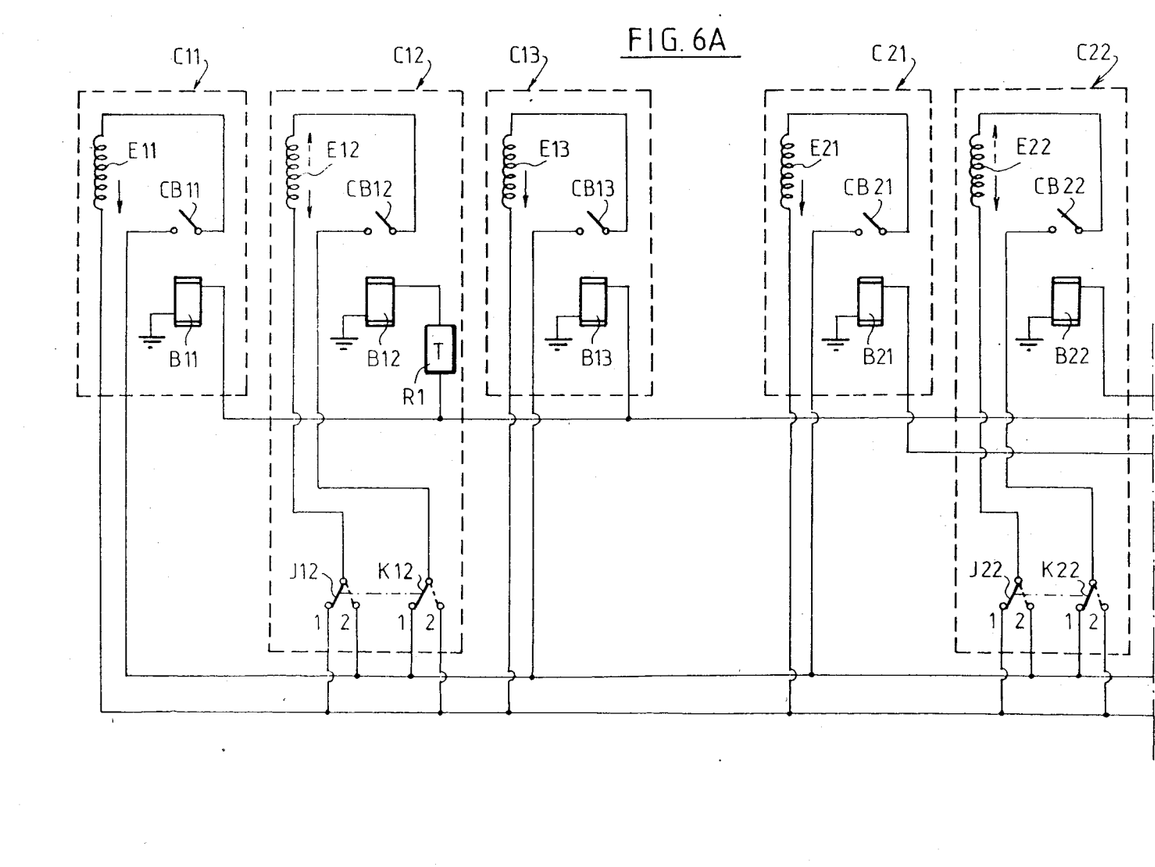
FIG. 6A and 6B, when they are assembled, represent a diagram of the electrical circuits used for controlling the various recording heads in the machine shown in FIG. 2.
Figure 6B:
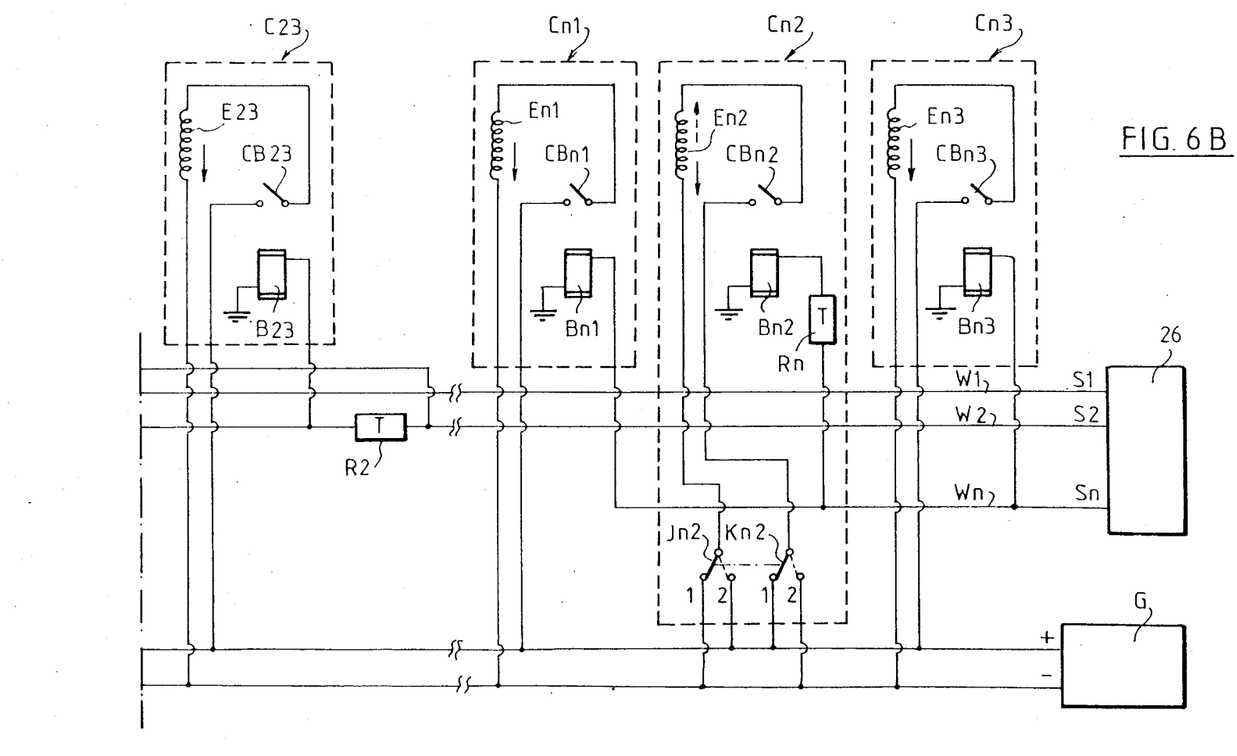

The electrical pulses which serve to excite the heads of the magnetic recording device 13 come from a pulse source 26 which is shown schematically in FIG. 2, these pulses being applied to the windings of these heads via a control and current inversion device 27, the structure of which is shown in detail in FIGS. 6A and 6B taken together.

FIGS. 6A and 6B should be considered together. For the sake of simplification, only the windings E11, E12, E13, E21, E22, E23 of the heads T11, T12, T13, T21, T22 and T23 comprising the first two groups of heads of the recording device 13, as well as the windings En1, En2 and En3 of the heads Tn1, Tn2 and Tn3 comprising the last group Gn of this device, have been shown. It will be understood that in viewing FIGS. 6A and 6B, each of the n windings E12, E22, ..., En2 of the heads of the first category (that is, the heads T12, T22, ..., Tn2) are part of one of the n circuit portions C12, C22, ..., Cn2, each of which is associated respectively with these n heads of the first category. In like fashion, each of the windings E11, E13, E21, E23, ..., En1 and En3 of the heads of the second category (that is, of the heads T11, T13, T21, T23, ..., Tn1 and Tn3) is part of one of the 2n circuit portions C11, C13, C21, C23, ..., Cn1 and Cn3, each of which is associated respectively with these 2n heads of the second category. The n circuit portions C12, C22, ..., Cn2 furthermore include one of the n first switches or inverter contacts J12, J22, ..., Jn2, one of the n second switches of relay contacts CB12, CB22, ..., CBn2, the contacts J12, K12 and CB12 being part of the circuit portion C12, the contacts J22, K22 and CB22 being part of the circuit portion C22, etc. In each of the circuit portions C12, C22, ..., Cn2, the winding of the head is connected at one of its ends to the movable contact spring of the first associated inverter contact and, on the other end, to the movable contact spring of the second associated inverter contact, via the associated relay contact. Each of the relay contacts CB12, CB22, ..., CBn2 is controlled by a respective one of n relay coils B12, B22, ..., Bn2. FIGS. 6A and 6B also show that each of the inverter contacts J12, J22, ..., Jn2 and K12, K22, ..., Kn2 includes two contact terminals designated by the numbers 1 and 2. The contact terminal 2 of each of the first inverter contacts J12, J22, ..., Jn2 is connected to the positive terminal (+) of a current generator G, while the contact terminal 2 of each of the second inverter contacts K12, K22, ..., Kn2 is connected to the negative terminal (−) of this generator G. The contact terminal 1 of each of the inverter contacts J12, J22, ..., Jn2 is connected to the negative terminal (−) of the generator G, while the contact terminal 1 of each of the inverter contacts K12, K22, ..., Kn2 is connected to the positive terminal (+) of the generator G. FIGS. 6A and 6B show that the movable contact springs of the two inverter contacts, such as J12 and K12, which are part of the same circuit portion are mechanically coupled so that they can both be placed simultaneously either on their contact terminals 1 or on their contact terminals 2. Furthermore, as also shown in FIGS. 6A and 6B, in each of the 2n circuit portions C11, C13, C21, C23, ..., Cn1 and Cn3, the winding of the head is mounted in series with one of the 2n relay contacts CB11, CB13, CB21, CB23, ..., CBn1 and CBn3 each of which is associated respectively with each of these 2n circuit portions, and each set formed by one winding in series with a relay contact is connected to the terminals (+ and −) of the generator G. Each of the relay contacts CB11, C13, CB21, CB23, ..., CBn1 and CBn3 is controlled by a respective one of the 2n relay coils B11, B13, B21, B23, ..., Bn1 and Bn3.

The relay coils B11, B12, B13, B21, B22, B23, ..., Bn1, Bn2, Bn3 can be excited selectively by electrical pulses furnished at the outputs S1, S2, ..., Sn of the pulse source 26, each of these pulses causing the formation of a magnetized point on the magnetic layer, as will be seen below. To this end, the coils B11, B12 and B13 which are associated with the magnetic heads T11, T12 and T13 making up the group G1 are connected to the output S1 of the source 26, via a conductor W1. In like manner, the coils B21, B22 and B23 which are associated with the magnetic heads T21, T22 and T23 making up the group G2 are connected to the output S2 of the source 26, via a conductor W2, and so forth.

The structure of the pulse source 26 will not be described here, because this structure is of a known type. It will be assumed, in the example described, that this pulse source is analogous in structure to the recording control device described and shown in French Pat. No. 2.443.335, which corresponds to U.S. Pat. No. 4,312,045. It will merely be noted again that in the case where the machine shown in FIG. 2 is used to print characters, each of which comprises localized points in the interior of a rectangular matrix including seven lines and five columns (as in the example shown in FIG. 5), the lines of this matrix extending in a direction that is parallel to the axis of rotation 22 of the drum 10, the latent magnetic image that is required for printing one character is obtained by selectively exciting five groups of three successive magnetic heads, taken from among all the magnetic heads of the recording device 13, and doing so seven different times. This excitation is effected by means of pulses furnished at successive instants $t_1$, $t_2$, $t_3$, $t_4$, $t_5$, $t_6$ and $t_7$, via five corresponding ones of the outputs S1–Sn of the pulse source 26. Thus in order to form the latent magnetic image required for printing the letter G, for example, by means of five groups of magnetic heads, including the heads T11, T12 and T13 for the first group G1, the heads T21, T22 and T23 for the second group G2, the heads T31, T32 and T33 for the third group G3, the heads T41, T42 and T43 for the fourth group G4, and the heads T51, T52 and T53 for the fifth group G5, the pulse source 26 furnishes the following:

at time $t_1$, a pulse at each of its outputs S2–S4, these pulses then exciting the second, third and fourth groups of heads, that is, the heads T21, T22, ..., T42 and T43;

at time $t_2$, a pulse at each of its outputs S1 and S5, these pulses then exciting the first and fifth groups of heads;

at time $t_3$, a pulse at its output S5, this pulse then exciting the fifth group of heads, that is, the heads T51, T52 and T53;

at time $t_4$, a pulse at each of its outputs S1, S2, S3 and S5, these pulses then exciting the first, second, third and fifth groups of heads;

at time $t_5$, a pulse at each of its outputs S1 and S5, these pulses then exciting the first and fifth groups of heads;

at time $t_6$, a pulse at ieach of its outputs S1 and S5, these pulses then exciting the first and fifth groups of heads;

and at time $t_7$, a pulse at each of its outputs S2–S4, these pulses then exciting the second, third and fourth groups of heads.

The inverter contacts J12, J22, ..., Jn2 and K12, K22, Kn2 which are part of the circuit portions C12, C22, ..., Cn2 associated with the heads of the first category are intended for determining the direction along which the magnetization of the elementary magnetized domain D2 of each magnetized point formed on the drum 10 will be oriented. This direction determines the type of point, and consequently the color of the punctiform spot which this point will later make it possible to form on the paper. Thus, in the case where the two inverter contacts of the same circuit portion are placed on their contact terminals 1, the current which travels through the winding of the head associated with this circuit portion during the entire time that the relay contact that is in series with this winding is closed circulates in this winding in the direction indicated, in FIGS. 6A and 6B, by an arrow drawn in solid lines.

It will be assumed in the example described that when the current passing through such a winding is circulating in the direction indicated by a solid-line arrow in FIGS. 6A and 6B, the elementary magnetized domain D2 which is formed in the magnetic layer 12 by the head provided with this winding will have a south magnetic polarity (S) at the surface of this layer. Contrarily, in the case where the two inverter contacts of this circuit portion are placed on their contact terminals 2, the current passing through the winding of the head associated with this circuit portion, during the entire time that the relay contact that is in series with the winding is closed, will circulate in this winding in the direction indicated by an arrow in broken lines in FIGS. 6A and 6B. In this case, the elementary magnetized domain D2 which is formed in the magnetic layer 12 by the head provided with this winding has a north magnetic polarity (N) on the surface of this layer.

It should be noted that in the circuit portions C11, C13, C21, C23, ..., Cn1 and Cn3 which are associated with the heads of the second category, the current passing through each of the windings of these heads circulates in the same direction (the direction indicated by the arrows drawn in solid lines), this direction being such that the elementary magnetized domains D1 and D3 which are formed in the magnetic layer 12 by the heads of the second category all have a south magnetic polarity (S) at the surface of this layer. Under these conditions, given that the direction in which the current circulates in each of the windings of the heads of the first category is determined by the position of the inverter contacts of each of the circuit portions associated with these heads, it will now be seen that in appropriately positioning the inverter contacts J12, J22, ..., Jn2 and K12, K22, ..., Kn2, prior to which the source 26 does not furnish any pulses at its outputs, the result obtained on the drum 10 when these pulses are furnished is magnetized points, the domains D1 and D3 of which all have a south magnetic polarity (S), and the domain D2 of which has either a south magnetic polarity (S) or a north ma9netic polarity (N). Thus if, for example, prior to the sending of pulses by the source 26, the inverter contacts J22 and K22 have been placed on their contact terminals 2, then the magnetized domains D1, D2 and D3 which are formed by the heads T21, T22 and T23 in response to the pulses furnished by the source 26 will have, respectively, one south magnetic polarity (S), one north magnetic polarity (S) and one south magnetic polarity (S), such that the magnetized point comprising these three domains is of the second type.

It will now be remembered that the recording poles of the various heads are aligned, either along the line L or along the line M (shown in FIG. 3), and that because of this the windings of the heads of which the poles are aligned along the line M must be excited with a certain delay T with respect to the instants of excitement of the heads of which the poles are aligned along the line L. The value of this delay is equal to the value H/V defined earlier herein. To this end, as shown in FIGS. 6A and 6B, delay elements R1, R2, ..., Rn are mounted in series with the relay coils assoicated with the heads of which the recording poles are aligned along the line M. Each element is arranged such that in response to an electrical pulse applied to its input it will furnish a delayed pulse at its output at the end of the above-defined time T. Thus in the example shown in FIGS. 6A and 6B, the coil B12 is excited only after the time T has elapsed, counting from the instant that the coils B11 and B12 are excited. In like manner, the coils B21 and B23 are not excited until after the time T has elapsed, counting from the time that the coil B22 is excited, and so forth. Because of this arrangement, each of the pulses furnished by the source 26 makes it possible to obtain three magnetized domains D1, D2 and D3, which since they belong to the same magnetized point are contiguous with one another and are aligned along the same generatrix of the drum 10. If the two inverter contacts associated with the head serving to form the domain D2 of this point have previously, prior to which time the source 26 has not sent any pulses, been placed at their contact terminals 1, then the magnetized point obtained is of the first type. Contrarily, if thse two inverter contacts have previously been placed at their contact terminals 2, then the magnetized point is of the second type.

The positioning of the inverter contacts J12, J22, ..., Jn2 and K12, K22, ..., Kn2 at one or the other of their two contact terminals 1 or 2 can be effected either manually by the operator, before every printing operation, or entirely automatically; in the latter case, these inverter contacts are controlled by actuation means of a known type which are excited by the same control unit as the one that controls the functioning of the pulse source 26. It should furthermore be noted that depending on the case and on the applications, certain ones of these inverter contacts can be placed at their contact terminals 2, while others of them are placed at their contact terminals 1, which makes it possible, for instance when printing a line of characters, to obtain characters printed in one of two colors, while the other characters in this line are printed in the other color.

It should again be noted that, in the example described, the control and current inversion apparatus 27 which is shown in FIG. 2 comprises the set including the inverter contacts J12, J22, ..., Jn2 and K12, K22, ..., Kn2, the coils B11, B12, B13, B21, B22, B23, ..., Bn1, Bn2, Bn3 and their contacts CB11, CB12, CB13, CB21, CB22, CB23, ..., CBn1, CBn2 and CBn3, the delay elements R1, R2, ..., Rn, all of these devices being connected to one another in the manner shown in FIGS. 6A and 6B.

In the general case where each magnetized point includes k elementary magnetized domains, the control and current inverting device 27 then includes pn circuit portions, which are each associated respectively with one of the pn heads of the first category and have a structure analogous to that of the portions C12, C22, ..., Cn2, and (k−p)n circuit portions, which are each associated respectively with one of the (k−p)n heads of the second category and have a structure analogous to that of th portions C11, C13, C21, C23, ..., Cn1 and Cn3.

Returning to FIG. 2, it can be seen that the printing machine that is realized according to the invention again includes a first applicator device 40, of a known type, which makes it possible to apply particles of a first powdered developer, contained in a reservoir 49, onto the surface of the drum 10. As indicated above, this first powdered developer comprises low-retentivity particles coated with a thermoplastic resin containing a pigment which, in the example described, is red. The first applicator device 40 is dispsoed below the drum 10 and is arranged such that the layer of first developer which is thus deposited onto each of the magnetized points of the first type on this drum has a thickness substantially equal to 83 microns, while the layer that is deposited onto each of the magnetized points of the second type on this drum has a thickness substantially equal to 90 microns. Preferably this applicator device 40 is of the same type as those described and shown in French Pat.

Nos. 2.408.462 and 2.425.941 as well as in the French patent application published under No. 2.521.069, this device including on the one hand a rotating magnetic element which moves the developer particles from the reservoir 49 to the vicinity of the surface of the drum 10, and on the other hand a deflector disposed between this magnetic element and the drum so as to comprise a trough in which the particles received by the deflector accumulate. Between itself and the drum, this deflector leaves only a very small opening, on the order of 2 millimeters, by way of which the particles which have come to be applied to the surface of the drum pass. The magnetized points of the drum 10 which have thus been covered by a layer of first developer then pass before a retouching device 41, which enables both the elimination of the developer particles remaining on the drum 10 outside the magnetized points and also the removal of the first developer located on the magnetized points of the first type. The retouching device 41 which is used for this operation may be either the electrostatic or the pneumatic type. It will be assumed that in the example described, this retouching device 41 is of the type described and shown in French Pat. No. 2.411.435, which corresponds to U.S. Pat. No. 4,345,684, and that it is regulated such that it completely removes the layers of first developer covering the magnetized points of the first type, while leaving a layer of first developer on each of the magnetized points of the second type, the thickness of which layer is virtually equal to 27 microns.

The magnetized points of the drum 10 which have undergone this retouching operation then pass before a second applicator device 42, of a type analogous to that of the first applicator device. This second applicator device makes it possible to deposit onto the drum 10 particles of a second powdered developer, which being black in color, in the example described, is contained in a reservoir 50. Hence, as mentioned above, this second developer in powder form comprises high-retentivity particles coated with a thermoplastic resin containing a pigment, this pigment here being black. The second applicator device 42 is practically disposed below the drum 40, and it is arranged such that the layer of second developer which is thus deposited on each of the magnetized points of the first type on this drum has a thickness substantially equal to 83 microns, while the layer of second developer which is deposited on top of each of the layers of first developer covering the magnetized points of the second type has a thickness substantially equal to 48 microns. Given that in the example described the thickness of the layer of first developer covering the points of the second type is in the vicinity of 27 microns, the total thickness of the two layers of developer on each of the magnetized points of the second type is thus practically equal to 75 microns.

The magnetized points of the drum which have passed before the second applicator device 42 then pass before a second retouching device 43 which is analogous to the retouching device 41. This retouching device 43, in the example described, is regulated such that the layers of second developer which are superimposed on the layers of first developer covering the magnetized points of the second type are totally eliminated, and the thickness of the layers of second developer which cover the magnetized points of the first type is reduced, without becoming less than the thickness $a_1$ of the layers of first developer on the magnetized points of the second type. The regulation that is provided in the example described is such that after the retouching operation performed by this device 43, each of the magnetized points of the second type is covered with a layer of first developer the thickness of which is substantially equal to 27 microns, while each of the magnetized points of the first type is covered with a layer of second developer the thickness of which is in the vicinity of 30 microns.

The magnetized points of the drum 10 which have undergone this second retouching operation are then put into contact with a strip of paper 20, which is applied to the drum 10 as shown in FIG. 2, under the influence of a pressing roller 45. The force with which the strip 20 is applied to the drum 10 by the pressing roller 45 may be adjusted by known means (not shown) in such a manner as to cause a virtually total transfer of all the layers of developers remaining on the drum 10 after the passage before the retouching device 43. As shown in FIG. 7, the value $F_T$ of this force is greater than that of $F_1$ mentioned above, such that finally the layers of first and second developers which had been deposited on the magnetized points of the drum 10 are now transferred virtually totally onto the strip of paper 20.

The machine shown in FIG. 2 also includes a developer fixation device 46, beneath which the strip of paper 20 passes when the transfer operation that has just been described has been executed. The fixation device 46, which in the example described comprises an electric infrared heating element, is intended for permanent fixation of the developers which have been transferred onto the strip of paper 20. It should be noted here that this fixation device 46 is regulated such as to cause complete melting of the two developers, without causing burning or even deterioration of the strip of paper 20 in order to do so. This is accomplished in that the melting temperature of these developers, in the example described, is less than 140° C. Under these conditions, each pile such as 34, after having been melted and then cooled, forms a punctiform spot on the paper, the spot having the color of the second developer, while each pile such as 35, after having been melted and then cooled again, forms a punctiform spot on the paper having the color of the first developer.

The machine shown in FIG. 2 further includes a cleaning device, in the example described comprising a brush 47, which assures the cleaning of the portions of the surface of the drum 10 which have traveled before the transfer post. After this cleaning, these portions pass before an electromagnetic erasing device 48, which effects the erasure of the latent magnetic images carried by these portions, such that these portions are once again capable of being magnetized when they later pass before the magnetic recording device 13 again.

It will be understood that the invention is in no manner limited to the modes of embodiment described and shown herein, which have been given solely by way of example. On the contrary, the invention includes any means comprising techniques equivalent to those described and shown, taken either individually or in combination and put to use within the scope of the claims, which follow.

What is claimed is:

1. A method of magnetographic printing in two preselected colors on a printing medium, comprising:
    magnetizing the surface of a magnetic recording element in a direction perpendicular to said surface to form separate magnetized points which define a latent magnetic image, said points all having the same size and each comprising the same number k, which equals at least two, of contiguous elementary magnetized domains all having the same magnetization intensity, said magnetized points being either of a first type in which the magnetized domains all have the same magnetic polarity, or of a second type in which the magnetic polarity of the domains alternates from one domain to an adjacent domain;

depositing on the surface a first powdery developer, the color of which is that of a first one of said colors, said first developer being adapted to remain applied only to the magnetized points of said surface;

eliminating said first developer from said surface except at the magnetized points of the second type;

depositing on said surface a second powdery developer, the color of which is that of a second one of said colors, said second developer being adapted to remain applied only to the magnetized points of said surface, said first and second powdery developers comprising magnetic particles and having substantially the same physical properties with the exception of their color and their magnetic characteristics;

eliminating said second developer from said surface except at magnetized points of the first type, each of said points of the first type thereby being covered with a layer of said second developer while each of the magnetized points of the second type is covered by a layer of said first developer; and effecting a transfer of all the layers of developers onto the printing medium.

2. A method of magnetographic printing in two preselected colors on a printing medium, comprising magnetizing the surface of a magnetic recording element in a direction perpendicular to said surface to form a plurality of separate magnetized points which define a latent magnetic image, said points all having the same size and each comprising a predetermined number at least equal to two of contiguous elementary magnetized domains, each of the magnetized domains having the same magnetization intensity, and said magnetized points being either of a first type in which the magnetized domains of such points all have the same magnetic polarity, or being of a second type in which adjacent magnetic domains have alternating magnetic polarity; forming on the surface at the magnetized points of the first type and to the exclusion of the magnetized points of the second type a layer of a first powdery developer, the color of which is a first one of said preselected colors; forming at the surface at the magnetized points of the second type and to the exclusion of the magnetized points of the first type a layer of a second powdery developer, the color of which is a second one of said preselected colors; said first and second developers comprising magnetized particles and being adapted to remain applied only to said magnetized points, and said developers having substantially the same physical properties with the exception of their color and their magnetic characteristics; and transferring the layers onto the printing medium.

3. A magnetographic printing machine for printing on a printing medium an image in two preselected colors, said machine comprising:

a recording element having a magnetic recording surface;

magnetic recording means including a plurality of magnetic heads and pulse means for selectively transmitting electric pulses to each of said magnetic heads, said magnetic heads being adapted to magnetize said recording surface in response to said pulses in a direction perpendicular to said surface so as to form a set of magnetized points on said surface which define a latent magnetic image, said points all having the same size and each point comprising a number k, which equals at least two, of contiguous elementary magnetic domains, said domains all having the same intensity of magnetization;

drive means for effecting a relative displacement between the recording element and the magnetic recording means;

current controlling and inverting means for selectively reversing the direction of current of the pulses transmitted to each of said magnetic heads such that the magnetized points formed on the recording surface are either of a first type in which the elementary domains all have the same magnetic polarity, or of a second type in which the magnetic polarity alternates from one domain to an adjacent domain;

first applicator means for depositing on said recording surface a first developer in powder form having the color of one of the preselected colors;

second applicator means disposed downstream, with respect to the direction of displacement of said surface, of the first applicator means for depositing on said surface a second developer in powder form having the color of another of said preselected colors, said first and second developers being of a type which remain applied only to the magnetized points of said surface, said first and second developers including magnetic particles and having practically the same physical properties with the exception of their color and of their magnetic characteristics;

first retouching means disposed between said first and second applicator means and arranged to withdraw said first developer from the recording surface except at the magnetized points of the second type;

second retouching means disposed downstream of said second applicator means and arranged to withdraw said second developer from said surface except at the magnetized points of the first type, such that each of the points of the first type is covered with a single layer of said second developer, while each of the points of the second type is covered with a single layer of said first developer, said two developers thus forming an image in powder in two colors on the recording surface; and means for transferring said image in powder onto said printing medium.

4. A magnetographic printing machine for printing on a printing medium an image in two preselected colors, said machine comprising a magnetic recording surface; magnetic recording means for selectively magnetizing said surface in a direction perpendicular to the surface and so as to form a plurality of separate magnetized points on said surface which define a latent magnetic image, said points all having the same size and each point comprising a predetermined number at least equal to two of contiguous elementary magnetic domains all having the same magnetization intensity, said magnetized points being either of a first type in which the magnetic domains all have the same magnetic polarity, or of a second type in which adjacent magnetic domains have alternating polarity; first means for forming on the surface at the magnetized points of the first type and to the exclusion of the magnetized points of the second type a layer of a first powdery developer, the color of which is a first one of the preselected colors; second means for forming on the surface at the magnetized points of the second type and to the exclusion of the magnetized points of the first type another layer of a second powdery developer, the color of which is the second one of said preselected colors; said first and second developers being formed to remain applied only to the magnetized points of said surface, the first and second developers comprising magnetic particles of different magnetic characteristics and having substantially the same physical properties with the exception of their color; and means for transferring the layers of the first and second developers onto said printing medium.

5. A method of magnetographic printing according to claim 1, wherein each magnetized point comprises at least three elementary magnetized domains, said domains being juxtaposed with respect to one another to form a magnetized point having substantially the shape of a square.

6. A method as set forth in claim 5, wherein the shape of each domain is a rectangle, there being three domains, each domain having a length substantially three times its width.

7. A method as set forth in claim 5, wherein the shape of each domain is substantially a square, there being four domains to each point.

8. A magnetographic printing machine according to claim 3, wherein each magnetic head is arranged to form an elementary magnetized domain on the recording surface, the magnetic heads being arranged in n groups, each group including k magnetic heads, said k heads being distributed among p heads of a first category to form elementary magnetic domains having alternate magnetic polarity, and (k—p) heads of a second category intended to form elementary magnetic domains all having the same magnetic polarity, p being an integer which, in the case where k is even, is equal to k/2 and, in the case where k is odd, is equal to (k−1)/2.

9. A magnetographic printing machine according to claim 8, wherein each magnetic head comprises a winding wound about a core, and the current controlling and inverting means comprises:

pn circuit portions each associated, respectively, with one of the pn heads of the first category, each of said circuit portions including a relay having a relay contact connected in series with the winding of the associated head and actuated by a coil excited selectively by the pulses sent by the pulse means, and a first switch having two positions and a movable contact connected to the winding and in series with said relay contact, said first switch being coupled to a movable contact of a second switch such that the movable contacts of these two switches occupy identical positions, (k−p)n circuit portions each associated, respectively, with one of the (k−p)n heads of the second category, each of said (k−p)n circuit portions including a relay contact connected in series with the winding of the associated head and actuated by a coil excited selectively by the pulses sent by the pulse means; and a current generator having a negative terminal connected to a first of the two positions of each of the pn second switches, and to a second of the two positions of each of the pn first switches, and having a positive terminal connected to the second of the two positions of each of the pn second switches and to the first of the two positions of each of the pn first switches, said terminals being further connected, respectively, in each of said (k−p)n circuit portions, to the winding in series with the relay contact.

10. A magnetographic printing machine according to claim 3, wherein the magnetic heads have recording poles and are positioned such that their respective recording poles are aligned along at least one straight line oriented perpendicularly to the direction of displacement relative of the recording element.

11. A magnetographic printing machine according to claim 3, wherein the magnetic heads have recording poles and are positioned such that their respective recording poles are aligned along two straight lines oriented perpendicularly to the direction of relative displacement of the recording element and in such a manner that, when the recording pole of a magnetic head is located on a first one of said straight lines, the recording pole of a following magnetic head is located on the second one of these straight lines.

12. A magnetographic printing machine according to claim 11, wherein the current controlling and inverting means further includes delay elements disposed to assure the transmission, with a delay T, of the pulses which are generated by the pulse means, said pulses being applied to excite the magnetic heads having recording poles which are aligned along the first one of the two straight lines which is located downstream from the second one of the lines with respect to the direction of relative displacement of the recording element, said delay T being equal to the ratio H/V, in which H represents the spacing between said straight lines and V represents the linear speed of the relative displacement of said recording element.

13. A magnetographic printing machine according to claim 8, wherein the magnetic heads have recording poles and are positioned such that their respective recording poles are aligned along at least one straight line oriented perpendicularly to the direction of displacement relative to the recording element.

14. A magnetographic printing machine according to claim 9, wherein the magnetic heads have recording poles and are positioned such that their respective recording poles are aligned along at least one straight line oriented perpendicularly to the direction of displacement relative to the recording element.

15. A magnetographic printing machine according to claim 8, wherein the magnetic heads have recording poles and are positioned such that their respective recording poles are aligned along two straight lines oriented perpendicularly to the direction of relative displacement of the recording element and in such a manner that, when the recording pole of a magnetic head is located on a first one of said straight lines, the recording pole of a following magnetic head is located on the other of these straight lines.

16. A magnetographic printing machine according to claim 9, wherein the magnetic heads have recording poles and are positioned such that their respective recording poles are aligned along two straight lines oriented perpendicularly to the direction of relative displacement of the recording element and in such a manner that, when the recording pole of a magnetic head is located on a first one of said straight lines, the recording pole of a following magnetic head is located on the other of these straight lines.

17. A magnetographic printing machine according to claim 15, wherein the current controlling and inverting means further includes delay elements disposed to assure the transmission, with a delay T, of the pulses which are generated by the pulse means, said pulses being applied to excite the magnetic heads having recording poles which are aligned along the first one of the two straight lines which is located downstream from the second one with respect to the direction of relative displacement of the recording element, said delay T being equal to the ratio H/V, in which H represents the spacing between said straight lines and V represents the linear speed of the relative displacement of said recording element.

18. A magnetographic printing machine according to claim 16, wherein the current controlling and inverting means further includes delay elements disposed to assure the transmission, with a delay T, of the pulses which are generated by the pulse means, said pulses being applied to excite the magnetic heads having recording poles which are aligned along the first one of the two straight lines which is located downstream from the second one with respect to the direction of relative displacement of the recording element, said delay T being equal to the ratio H/V, in which H represents the spacing between said straight lines and V represents the linear speed of the relative displacement of said recording element.

19. A method of magnetographic printing according to claim 1, wherein said first developer includes a ferromagnetic ingredient comprising low-retentivity particles, and said second developer includes a ferromagnetic ingredient comprising high-retentivity particles.

20. A method as set forth in claim 2, wherein the first and second developers have the same granulometric state, the same density, and the same melting point, and the magnetic particles of the first developer comprise high-retentivity particles and the magnetic particles of the second developer comprise low-retentivity particles, and wherein said forming steps comprise first depositing on said surface the second developer, applying a force to said surface sufficient to eliminate the second developer from the surface and from the magnetized points of the first type while leaving a coating of second developer on the surface at the magnetized points of the second type, depositing the first developer on the surface at the magnetized points of the first type and on the coating of second developer at the magnetized points of the second type, and applying to the surface another force sufficient to eliminate the first developer from the coating of the second developer and so as to leave on the surface said layers of first and second developer at the magnetized points of the first and second types, respectively.

21. A method as set forth in claim 2, wherein said magnetizing comprises magnetizing the surface such that each of said magnetized points comprises at least three contiguous elementary magnetic domains.

22. A magnetographic printing machine according to claim 4, wherein the first and second developers have the same granulometric state, the same density, and the same melting point, and wherein the first developer comprises high-retentivity magnetic particles and the second developer comprises low-retentivity particles.

* * * * *